United States Patent [19]

McLaughlin et al.

[11] Patent Number: 4,508,742

[45] Date of Patent: Apr. 2, 1985

[54] TREATING BEER TO PREVENT CHILL HAZE AND METAL CONTAMINATION

[75] Inventors: John R. McLaughlin, Media, Pa.; Elliot P. Hertzenberg, Wilmington, Del.

[73] Assignee: PQ Corporation, Valley Forge, Pa.

[21] Appl. No.: 492,314

[22] Filed: May 6, 1983

[51] Int. Cl.³ .................. C12H 1/04; C01B 33/24; C10M 7/02
[52] U.S. Cl. .................. 426/330.4; 426/423; 426/424; 426/495; 423/331; 502/410
[58] Field of Search ............ 426/423, 442, 592, 495, 426/330.4, 424; 423/331; 502/410, 83; 252/28

[56] References Cited

U.S. PATENT DOCUMENTS

| | | | |
|---|---|---|---|
| 3,436,225 | 4/1969 | Raible | 426/423 |
| 3,617,301 | 11/1971 | Barby et al. | 426/442 |
| 3,940,498 | 2/1976 | Butterworth et al. | 426/423 |
| 4,202,910 | 5/1980 | Bradley et al. | 426/423 |

*Primary Examiner*—Raymond Jones
*Assistant Examiner*—Elizabeth C. Weimar
*Attorney, Agent, or Firm*—Ernest G. Posner; Fred C. Philpitt; J. S. Stephen Bobb

[57] ABSTRACT

Inorganic chill-proofing and other agents that are used to process stable beer often contain metals such as iron and copper that are soluble in beer or other beverages. A small addition of magnesium silicate added to said chill-proofing agents, particularly silica hydrogel, substantially averts metal contamination in the beer.

11 Claims, No Drawings

4,508,742

TREATING BEER TO PREVENT CHILL HAZE AND METAL CONTAMINATION

BACKGROUND OF THE INVENTION

This invention relates to chill-proofing beverages such as beer while preventing contamination of the beer with metal ions. The invention involves a combination of chill-proofing agents and an amorphous magnesium silicate.

The term "beer" as used throughout this specification and the claims encompasses all types of malt beverages. Such beverages include, but are not limited to, lager, pilsner, Dortmund and Munich beer, as well as top fermented beverages such as ale, porter and stout.

Turbidity is an important and troublesome problem encountered in brewing operations and can be of biological or physico-chemical origins. Gross turbidity effects are overcome by filtering and/or other physical methods. Secondary and more subtle turbidity problems involve the haze which develops on aging and/or chilling the beer. This haze is caused by the coagulation of certain organic materials in the beer. Numerous inorganic and organic substances can be used to adsorb the materials that combine to form the haze so that they can be separated from the beer prior to packaging. Organic adsorbents may contain factors that are dissolved in the beer so that they are often rejected. Inorganic adsorbents and filter aids, often siliceous materials of high surface area, are effected in reducing or eliminating chill haze, but they may contain small quantities of metals that are soluble in beer and contaminate it. Such dissolved metals may de-stabilize colloidal constituents of beer, inducing lower quality. High dissolved iron levels affect beer quality and shelf life.

A number of inorganic adsorbents are used with filter aids in processes to remove materials that cause chill haze. Silica hydrogels and xerogels, calcium aluminum and magnesium silicates, diatomaceous earth, several types of natural minerals and clays and mixtures thereof have been suggested and used as chill-proofing agents. U.S. Patents that disclose such art include U.S. Pat. Nos. 3,163,538; 3,251,693; 3,436,225; 3,617,301; 3,940,498 and 3,958,023. Nearly all these materials originally contain metals or would pick up metals, particularly iron, during processing. At least a portion of these metals can be dissolved in beer, which is mildly acid, resulting in a loss of quality.

Bradley and McAdam, in U.S. Pat. No. 4,134,857, discuss the beer or beverage soluble-iron problem in connection with filter aids. Their solution to the problem is to treat the iron-containing materials with certain organic acids that dissolve out the iron that is soluble in beer. We believe this approach to be only partially successful in treating inorganic chill-proofing agents such as silica hydrogel while being rather expensive.

SUMMARY OF THE INVENTION

Inorganic chill-proofing agents that have a small amount of amorphous magnesium silicate added exhibit reduced levels of beverage- or beer-soluble metals. The inorganic chill-proofing agents are usually silica-containing adsorbents, the most useful agent being a silica hydrogel with a large surface area. A surprisingly small amount of the magnesium silicate, less than 6 parts by weight (pbw) per 100 pbw of the chill-proofing agent, can reduce the apparent metal contaminant level from significant levels, such as 15 to 50 ppm or more, to less than 10 ppm. Such reductions are about 5 times better than results obtained using other agents for the reduction of the beer- or beverage-soluble metals, usually iron. Results supporting these ideas are found in the examples. The magnesium silicate is useful in reducing beer-soluble metals even when the chill-proofing agent is used with a filter aid that can contain such metals.

THE INVENTION

Any inorganic chill-proofing agents, usually silica gels, benefit from being used with the magnesium silicate according to our invention. Such siliceous chill-proofing agents that contain up to 50 ppm or more of metals such as iron especially benefit from use with the magnesium silicate. We most prefer to use magnesium silicate with a specially prepared silica hydrogel which has a surface area of at least 700 $m^2/g$, a mean pore diameter of 30 to 120 Å, an average particle size of 20 microns or less and a loss on ignition of more than 50%. The preparation and properties of this hydrogel are disclosed in U.S. Pat. No. 3,617,301. This patent is hereby incorporated by reference. The silica gel magnesium silicate combination according to our invention can be used with filter aids.

Amorphous and porous magnesium silicate is required to reduce the beverage-soluble metal levels of inorganic siliceous chill-proofing agents or such chill-proofing agents used with filter aids. Such silicates are articles of commerce and can be prepared in a number of ways such as ion exchange of magnesium for the metals of other insoluble silicates; precipitation formed upon the contact of a magnesium salt and a source of silicate ions in aqueous medium; and ion exchange of magnesium ions onto previously prepared precipitated or gelled silica followed by washing, dewatering and drying steps to provide the appropriate silicate. U.S. Pat. Nos. 2,163,525 and 2,163,526 describe ion exchange methods, while U.S. Pat. Nos. 2,241,791 and 2,393,625 describe direct precipitation from a source of silicate and a magnesium salt. U.S. Pat. Nos. 1,999,210 and 2,498,353 also describe methods of preparing useful silicates. Meinhold, et al, "Magnesium Silicate—via Synthetic Route," *Chemical Processing*, June 1960, p. 36, reviews appropriate methods as well. These methods may be employed to prepare magnesium silicates that function to reduce the apparent level of beverage-soluble metals of combinations of the silicate and the chill-proofing agents or combinations of the silicate, chill-proofing agents and filter aids. Satisfactory materials are available from the Pilot Engineering Division of Reagent Chemical and Research, Inc. While nearly all amorphous and porous magnesium silicates that contain more than about 5% of magnesium oxide are effective to some degree, we prefer the material to have the properties summarized in Table I.

TABLE I

| Properties of Magnesium Silicate | |
|---|---|
| Mole Ratio $MgO:SiO_2$ | 1:1.6 to 4.7 |
| Surface Area ($M^2/g$) | 30 to 600 |
| Bulk Density Tamped (g/cc) | 0.25 to 0.75 |
| Weight loss 105° C. (wt %) | 5 to 20 |
| Ignition loss (wt %) | 10 to 35 |
| pH 5% wt in water | 8.5 to 10.5 |

The amount of magnesium present is important since we have found that magnesium silicates that have been acid washed to remove most of the magnesium are ineffective for the purposes of our invention as shown in the examples.

The combination of inorganic chill-proofing agent, preferably the specified silica hydrogel, is prepared by blending the two raw materials. This blending can be carried out in any manner; we have found it convenient to add the silicate to the chill-proofing agent when it is milled. From 0.2 to 6 pbw of the silicate per 100 pbw of the chill-proofing agent may be used with agents and filter aids high in iron or other metals. We prefer to have 0.3 to 3 pbw of silicate per 100 pbw of the silica gel or hydrogel, and we most prefer 0.5 to 2.5 pbw of silicate per 100 pbw of the silica hydrogel. Surprisingly, very small amounts of the magnesium silicate provide substantial reduction in the beer- or beverage-soluble metal content, especially iron, of various siliceous agents. Such effectiveness is particularly surprising since other adsorbing and ion exchange materials are about 5 times less effective, as illustrated in the examples.

EXAMPLES

The following examples illustrate certain embodiments of our invention. They should not be considered as establishing the scope or limitations of the invention. Said scope is defined in the disclosure and recited in the claims. The proportions are in parts by weight (pbw), percent by weight (%), or parts per million (ppm) unless otherwise indicated. The analyses reported in these examples were carried out using American Society of Brewing Chemists procedures with a commercially available beer which was decarbonated when necessary.

EXAMPLE 1

This example illustrates the treatment of beer using only a hydrogel and shows that iron is present after such treatment. The commercially available beer was treated with 600 ppm of the hydrogel that is also commercially available. Said hydrogel had a surface area of 800 m²/g, loss on ignition of 66.5%, and a mean pore diameter of 87 Å. The beer was filtered and the filtrate analyzed to indicate that the hydrogel contained 18 ppm of beer-soluble iron.

EXAMPLE 2

Combinations of the hydrogel used in Example 1 and an amorphous magnesium silicate were prepared and used to treat beer. Said magnesium silicate was BRITE-SORB 90[1] and had 3.25 moles of $SiO_2$ per mole of MgO, an average particle size of 30 microns, a surface area of 50 m²/g, a bulk density of 0.56 g/cc, a weight loss at 105° C. of 12% and an ignition loss of 23%. The mixtures prepared and the results obtained are summarized in the following table.

TABLE 2

| Combination | | Beer-Soluble |
|---|---|---|
| Hydrogel (pbw) | Magnesium Silicate (pbw) | Iron Content (ppm) |
| 99 | 1 | 6.4 |
| 97 | 3 | 4.4 |
| 95 | 5 | 1.3 |
| 90 | 10 | 0.1 |

These results indicate that addition of magnesium silicate to the hydrogel is effective in reducing the iron that is soluble in the beer, further indicating chill-hazeproofing and control of the iron available to the beer can be carried out in the same process step.
[1]BRITESORB ® is a registered trademark of PQ Corporation.

EXAMPLE 3

The performance of BRITESORB ®90 magnesium silicate was compared to that of two ion exchange resins in the test for beer-soluble iron. The ion exchange resins were AMBERLITE ®IRC-50[1], hydrogen form and AMBERLITE ®718, sodium form. The test runs are summarized in Table 3.

TABLE 3

| Hydrogel (pbw) | BRITE-SORB 90 (pbw) | AMBERLITE IRC-50 (pbw) | AMBERLITE 718 (pbw) | Beer-Soluble Iron (ppm) |
|---|---|---|---|---|
| 100 | — | — | — | 16 |
| 99 | — | 1 | — | 15 |
| 97 | — | 3 | — | 14 |
| 95 | — | 5 | — | 14 |
| 90 | — | 10 | — | 15 |
| 98 | — | — | 2 | 11 |
| 95 | — | — | 5 | 8 |
| 99 | 1 | — | — | 6 |
| 97 | 3 | — | — | 3 |
| 95 | 5 | — | — | 2 |

These results show clearly that magnesium silicate is surprisingly effective in reducing the beer-soluble iron content of silica hydrogel when compared to ion exchange resins.
[1]AMBERLITE ® is a registered trademark of Rohm & Haas Co.

EXAMPLE 4

Another series of beer-soluble iron determination was carried out comparing an acid washed BRITESORB 90; Zeolite NaA; AMBERLITE IRC-50, sodium form; and MAGNESOL ®30/40[1] magnesium silicate. The acid washed BRITESORB 90 was prepared by mixing 100 pbw of the magnesium silicate with 100 pbw of deionized water and 100 pbw of concentrated HCl for 30 minutes. The slurry was filtered and the resulting filter cake washed with a mixture of 500 pbw of de-ionized water and 500 pbw of concentrated HCl. Washing was completed with 2500 pbw of de-ionized water. The product was dried overnight at 105° C. The acid-washed material contained less than 1% MgO. The MAGNESOL had a mole ratio of 1.0 MgO:2.60 $SiO_2$, a loss at 105° C. of 14%, a bulk density of 28 lbs/cu ft and a surface area of 397 m²/g. The beer-soluble iron tests were carried out as previously indicated with the same hydrogel, and the results are summarized in Table 4.
[1]MAGNESOL ® is a registered trademark of Reactant Chemical & Research, Inc.

TABLE 4

| Additives | | | | Beer-Soluble Iron ppm |
|---|---|---|---|---|
| Zeolite NaA % wt/wt | Acid-Washed BRITESORB % wt/wt | AMBERLITE IRC-50 % wt/wt | MAGNESOL 30/40 % wt/wt | |
| 0 | — | — | — | 40 |
| 1 | — | — | — | 40 |
| 3 | — | — | — | 38 |
| 5 | — | — | — | 36 |
| — | 0 | — | — | 34 |
| — | 10 | — | — | 33 |
| — | — | 0 | — | 34 |
| — | — | 1 | — | 27 |
| — | — | 10 | — | 13 |
| — | — | — | 0 | 33 |
| — | — | — | 1 | 7 |
| — | — | — | 3 | 3 |

TABLE 4-continued

| Additives | | | | Beer-Soluble Iron ppm |
|---|---|---|---|---|
| Zeolite NaA % wt/wt | Acid-Washed BRITESORB % wt/wt | AMBERLITE IRC-50 % wt/wt | MAGNESOL 30/40 % wt/wt | |
| — | — | — | 5 | 2 |
| — | — | — | 10 | 2 |

These results indicate that magnesium silicate is much more effective in suppressing the beer-soluble iron content of the silica hydrogel chill-proofing agent than any of the other agents tested. The results further indicate that magnesium silicate is effective at very low treatment levels.

EXAMPLE 5

MAGNESOL 30/40 was added to the silica hydrogel as it was being processed. Several bags were tested for total iron and beer-soluble iron as previously indicated. The results are summarized in Table 5.

TABLE 5

| Bag Number | Treatment Level | | Fe (ppm) | Beer-Soluble Iron (ppm) |
|---|---|---|---|---|
| | Measured Mg (%) | Calculated % MAGNESOL | | |
| 138 | 0.060 | 0.740 | 15 | 2.4 |
| 153 | 0.078 | 0.960 | 15 | 2.4 |
| 163 | 0.100 | 1.200 | 15 | 2.8 |
| 173 | 0.076 | 0.940 | 12 | 2.4 |
| 183 | 0.061 | 0.750 | 12 | 2.2 |
| 193 | 0.140 | 1.700 | 16 | 2.4 |
| 207 | 0.150 | 1.900 | 17 | 2.4 |
| 227 (control) | 0.006 | 0.074 | 14 | 12.0 |

These results also indicate that the magnesium silicate is very effective in reducing the beer-soluble iron at surprisingly low treatment levels.

EXAMPLE 6

This example illustrates that magnesium silicate adsorbs copper from aqueous solution. An aqueous solution containing 26 ppm of copper was contacted with 1% of BRITESORB 90 for 5 minutes. The level of copper as $Cu^{+2}$ was reduced to 0.1 ppm. This result indicates that magnesium silicate is effective for metals other than iron.

We claim:

1. A method of treating beer to prevent chill haze while averting metal contamination of the beer comprising the steps of:
   (a) contacting said beer with a combination of an inorganic chill-proofing agent and 0.2 to 6 pbw (parts by weight) of a porous, amorphous magnesium silicate for each 100 pbw of chill-proofing agent;
   (b) maintaining said contact for a time sufficient for said combination to adsorb the components of chill haze from the beer; and
   (c) separating the combination from the beer, said magnesium silicate having the following properties:

| Properties of Magnesium Silicate | |
|---|---|
| Mole Ratio $MgO:SiO_2$ | 1:1.6 to 4.7 |
| Surface Area ($M^2/g$) | 30 to 600 |
| Bulk Density Tamped (g/cc) | 0.25 to 0.75 |
| Weight loss 105° C. (wt %) | 5 to 20 |
| Ignition loss (wt %) | 10 to 35 |
| pH 5% wt in water | 8.5 to 10.5 |

2. The process of claim 1 wherein there is 0.3 to 3 pbw of magnesium silicate present for each 100 pbw of chill-proofing agent.

3. The process of claim 1 wherein the beer is also contacted with a filter aid.

4. The process of claim 3 wherein the chill-proofing agent is a silica gel.

5. The process of claim 4 wherein there is 0.3 to 3 pbw of magnesium silicate present for each 100 pbw of silica gel.

6. The process of claim 5 wherein the silica gel is a hydrogel with a surface area of at least 700 m²/g, a mean pore diameter of 30 to 120 Å, an average particle size of 20 microns or less, and a loss on ignition of more than 50%.

7. The process of claim 6 wherein there is 0.5 to 2.5 pbw of magnesium silicate present for each 100 pbw of the silica hydrogel.

8. A method of treating beer to prevent chill haze while averting metal contamination of the beer comprising the steps of:
   (a) contacting said beer with a combination of a silica gel and a porous, amorphous magnesium silicate, the amount of magnesium silicate being 0.2 to 6 pbw per 100 pbw of silica gel;
   (b) maintaining said contact for a time sufficient for said combination to adsorb chill-haze components from the beer; and
   (c) separating the combination from the beer; said magnesium silicate having the following properties.

| Properties of Magnesium Silicate | |
|---|---|
| Mole Ratio $MgO:SiO_2$ | 1:1.6 to 4.7 |
| Surface Area ($M^2/g$) | 30 to 600 |
| Bulk Density Tamped (g/cc) | 0.25 to 0.75 |
| Weight loss 105° C. (wt %) | 5 to 20 |
| Ignition loss (wt %) | 10 to 35 |
| pH 5% wt in water | 8.5 to 10.5 |

9. The method of claim 8 wherein the silica gel is a hydrogel with a surface area of at least 700 m²/g, a mean pore diameter of 30 to 120 Å, an average particle size of 20 microns or less, and a loss on ignition of more than 50%.

10. The process of claim 9 wherein there is 0.3 to 3 pbw of the magnesium silicate for each 100 pbw of the hydrogel.

11. The process of claim 9 where there is 0.5 to 2.5 pbw of magnesium silicate present for each 100 pbw of the silica hydrogel.

* * * * *